United States Patent
Butcher et al.

(10) Patent No.: US 11,601,515 B2
(45) Date of Patent: Mar. 7, 2023

(54) SYSTEM AND METHOD TO OFFLOAD POINT TO MULTIPOINT TRANSMISSIONS

(71) Applicant: DELL PRODUCTS, LP, Round Rock, TX (US)

(72) Inventors: Andrew Butcher, Cedar Park, TX (US); Shyamkumar Iyer, Cedar Park, TX (US); Srikrishna Ramaswamy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 127 days.

(21) Appl. No.: 17/072,547

(22) Filed: Oct. 16, 2020

(65) Prior Publication Data
US 2022/0124164 A1  Apr. 21, 2022

(51) Int. Cl.
*H04L 67/55* (2022.01)
*H04W 28/08* (2023.01)

(52) U.S. Cl.
CPC ......... *H04L 67/55* (2022.05); *H04W 28/0804* (2020.05); *H04W 28/0867* (2020.05)

(58) Field of Classification Search
CPC .............................. H04L 41/0668; H04L 41/06
See application file for complete search history.

(56) References Cited

U.S. PATENT DOCUMENTS

| | | | | |
|---|---|---|---|---|
| 9,319,267 | B1* | 4/2016 | Buchko | H04L 41/0668 |
| 2001/0032232 | A1* | 10/2001 | Zombek | H04L 69/16 |
| | | | | 709/201 |
| 2008/0285499 | A1* | 11/2008 | Zhang | H04W 72/0406 |
| | | | | 455/11.1 |
| 2012/0239849 | A1 | 9/2012 | Brahmaroutu et al. | |
| 2013/0301569 | A1* | 11/2013 | Wang | H04L 5/0055 |
| | | | | 370/329 |
| 2018/0302193 | A1* | 10/2018 | Akkarakaran | H04L 1/1854 |
| 2019/0132283 | A1 | 5/2019 | Ballard et al. | |

* cited by examiner

*Primary Examiner* — Sulaiman Nooristany
(74) *Attorney, Agent, or Firm* — Larson Newman, LLP

(57) ABSTRACT

An information handling system includes a publisher device and an offload device. Multiple subscriber devices are associated with the publisher device. The offload device communicates with the publisher device. The offload device receives a packet transmission from the publisher device, and translates a topic address of the packet transmission to multiple destination addresses. The offload device sends the packet transmission to each of the subscriber devices. Each of the subscriber devices is associated with a corresponding destination address of the multiple destination address. The offload device receives one or more acknowledgements from the subscriber devices, and combines the one or more acknowledgements into a composite completion message. The offload device sends the composite completion message to the publisher device.

20 Claims, 11 Drawing Sheets

SYSTEM AND METHOD TO OFFLOAD POINT TO MULTIPOINT TRANSMISSIONS

FIELD OF THE DISCLOSURE

This disclosure generally relates to information handling systems, and more particularly relates to offloading point to multipoint transmissions.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a publisher device and an offload device. Multiple subscriber devices may be associated with the publisher device. The offload device may communicate with the publisher device. The offload device may receive a packet transmission from the publisher device, and may translate a topic address of the packet transmission to multiple destination addresses. The offload device may send the packet transmission to each of the subscriber devices. Each of the subscriber devices may be associated with a corresponding destination address of the multiple destination address. The offload device may receive one or more acknowledgements from the subscriber devices, and may combine the one or more acknowledgements into a composite completion message. The offload device may send the composite completion message to the publisher device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
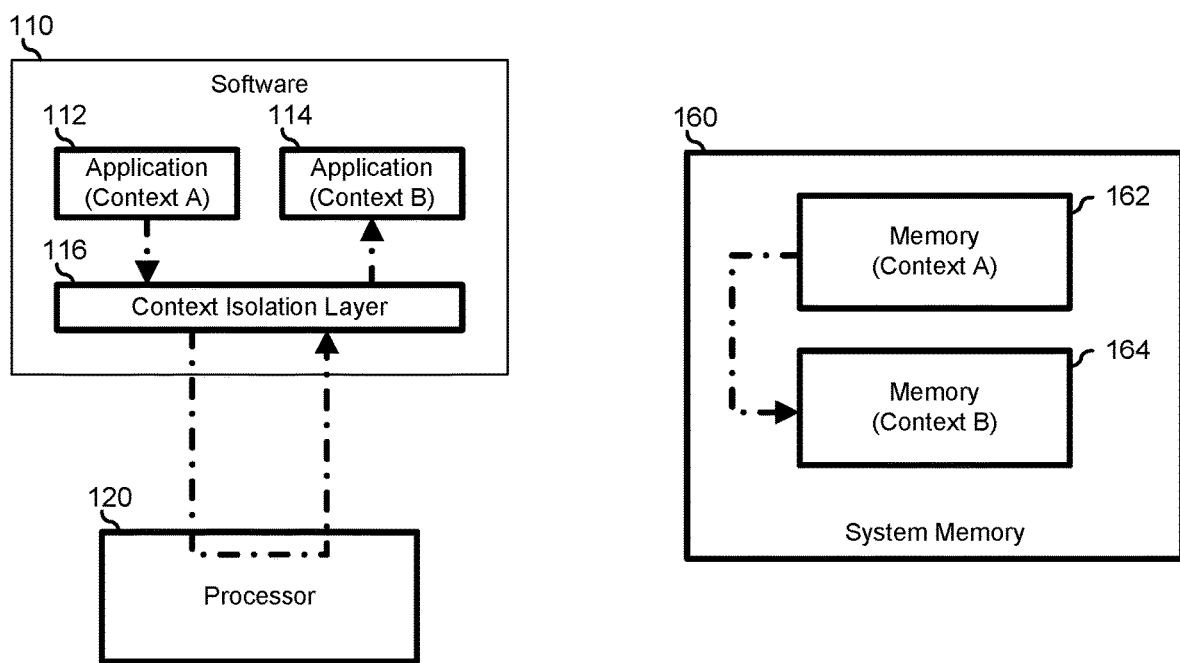
FIG. 1 is a block diagram of an information handling system according to the prior art.

FIG. 1 illustrates an information handling system 100 that utilizes a data exchange architecture in accordance with the prior art. Information handling system 100 includes software 110, a processor 120, and a system memory 160. Software 110 represents machine-executable code stored on information handling system 100 that is executable by processor 120, and includes a first application 112 that is associated with a first context, a second application 114 that is associated with a second context, and a context isolation layer 116. Application 112 is associated with one or more address ranges in the system physical address space (SPA) provided by system memory 160. The address ranges associated with application 112 are collectively shown as a portion 162 of system memory 160. Similarly, application 114 is associated with one or more address ranges in system memory 160, collectively shown as a portion 164 of the system memory. Context isolation layer 116 represents one or more agent, application program interface (API), utility, or the like that operates to maintain the segregation between memory 162 and 164. Examples of context isolation layer 116 may include a system Basic Input/Output System (BIOS) or Universal Extensible Firmware Interface (UEFI), hereinafter referred to collectively as "BIOS," that operates to provide isolated memory ranges for system operations, a virtual desktop system that segregates various memory ranges for the use of multiple users of the virtual desktop system, a hypervisor or virtual machine manager (VMM) that sets up and maintains virtual machines and their associated memory ranges, or the like.

In operation, when applications 112 and 114 are instantiated on information handling system 100, context isolation layer 116 allocates memory 162 and 164 to the use of their respective applications. In addition, when applications 112 and 114 need to interact, for example by moving data from one application to the other, context isolation layer 116 operates to manage the transfer of data between memory 162 and 164.

Note here that the data exchange architecture of information handling system 100 requires the execution of code associated with context isolation layer 116 by processor 120 in order to perform data transfers between memory 162 and memory 164. As such, the prior art data exchange architecture imposes a processing burden on processor 120, thereby reducing the processor cycles available for performing other tasks associated with applications 112 and 114. It will be understood that this processing overhead may be partially mitigated by the inclusion of Direct Memory Access (DMA) hardware in information handling system 100. However, it will be further understood that such DMA hardware is typically a vendor specific add-on, and access to such DMA hardware by applications 112 and 114 directly is typically difficult. In particular, even with the inclusion of DMA hardware, processor 120 is still needed to set up DMA transfers, and context isolation layer 116 is still needed in its role as gatekeeper to system memory 160.

Figure 2:
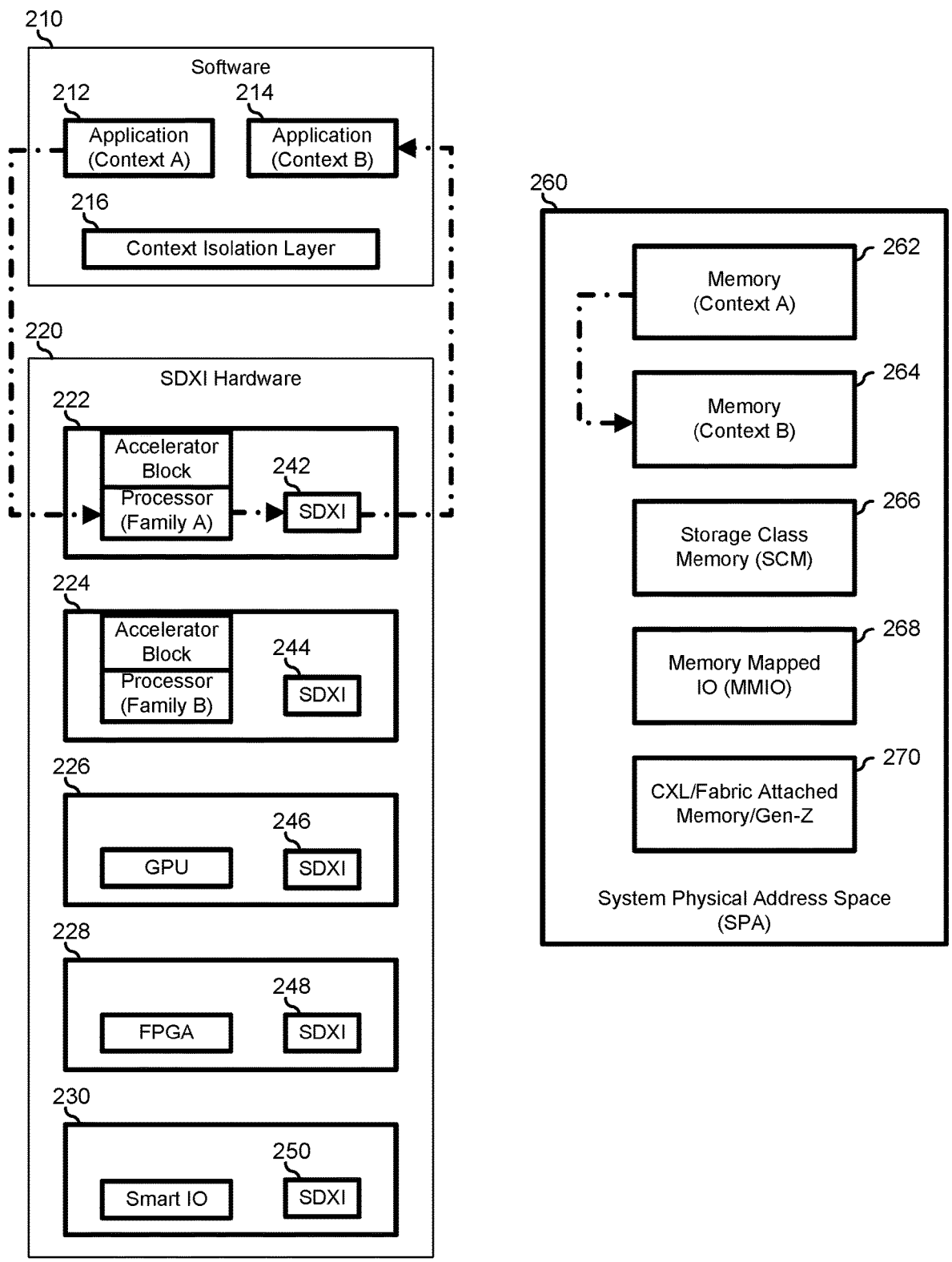
FIG. 2 is a block diagram of an information handling system according to an embodiment of the current disclosure.

FIG. 2 illustrates an information handling system 200 that utilizes a Smart Data Accelerator Interface (SDXI) data exchange architecture in accordance with an embodiment of the current disclosure. Information handling system 200 includes software 210, SDXI hardware 220, and a system physical address space (SPA) 260. SDXI hardware 220 includes a first family of processors 222 and an associated SDXI interface 242, a second family of processors 224 and an associated SDXI interface 244, one or more Graphics Processor Unit (GPU) 226 and an associated SDXI interface 246, a Field-Programmable Gate Array (FPGA) 248 and an associated SDXI interface 248, and a Smart I/O device 230 and an associated SDXI interface 250. Software 210 is similar to software 110, and represents machine-executable code stored on information handling system 200 that is executable by a processor such as one or more of processors 222 and 224. Software 210 includes a first application 212 that is associated with a first context, a second application 214 that is associated with a second context, and a context isolation layer 216. Software 210 may include functions and features similar to software 110, as described above. In particular, software 210 may implement the data exchange architecture of information handling system 100, as needed or desired. As such, application 212 is associated with one or more address ranges in SPA 260, with the associated address ranges shown as a portion 262 of the SPA, and application 214 is associated with one or more address ranges in the SPA, with the associated address ranges shown as a portion 264 in the SPA. Here too, context isolation layer 216 is similar to context isolation layer 116, representing one or more agent, API, utility, or the like that operates to maintain the segregation between memory 262 and 264. As such, context isolation layer 216 operates to allocate memory 262 and memory 264 when respective application 212 and application 214 are instantiated on information handling system 200, and the context isolation layer prevents the use of various memory ranges by unauthorized applications.

The SDXI data exchange architecture represents an industry effort to expand and standardize data movement protocols and hardware accelerator interfaces. As such, information handling system 200 broadens the scope of data exchanges on both the hardware side and the memory side. In particular, on the hardware side, SDXI hardware 220 incorporates various types of processing elements, co-processors, accelerators, and other data movers, as typified by processor families 222 and 224, GPU 226, FPGA 228, and Smart I/O device 230. On the memory side, SPA 260 is expanded to include not only the system physical memory, as typified by memory 262 and memory 264, but also separately attached memory, such as Storage Class Memory (SCM) devices 266, memory mapped I/O (MMIO) devices 268, and memory architectures, such as Compute Express Link (CXL) and Gen-Z memory interfaces, fabric-attached memory, and the like, as shown collectively as memory device 270. In particular, the SDXI data exchange architecture treats all of memory devices 262, 264, 266, 268, and 279 as a single SPA 260. The SDXI data exchange architecture then provides standardized interfaces for data movement between software 210, SDXI hardware 220, and SPA 260. Here, SDXI interfaces 242, 244, 246, 248, and 250 represent hardware and software associated with their respective hardware devices, such that a common set of SDXI commands, instructions, procedures, calls, and the like, referred to hereinafter as "SDXI commands," can be made to the hardware devices. Here, the details of implementing the various SDXI commands can be left to the design requirements and desires of the various hardware manufacturers. In this way, the SDXI data exchange architecture remains extensible and forward-compatible with new hardware or memory developments, and is independent of actual data movement details, data acceleration implementations, and the underlying I/O interconnect technology. The SDXI commands support: data movement between different address spaces including user address spaces located within different virtual machines; data movement without mediation by privileged software once a connection has been established; an interface and architecture that can be abstracted or virtualized by privileged software to allow greater compatibility of workloads or virtual machines across different servers; a well-defined capability to quiesce, suspend, and resume the architectural state of a per-address-space data mover to allow "live" workload or virtual machine migration between servers; mechanisms to enable forwards and backwards compatibility across future specification revisions, allowing software and hardware designed to different specification revisions to interoperate; the ability to incorporate additional offloads in the future leveraging the architectural interface; and a concurrent DMA model. As used herein, SDXI will be understood to represent any present or future specifications, specification revisions, articles, working papers, or other publications of the Smart Data Accelerator Interface (SDXI) Technical Working Group (TWG) of the Storage Networking Industry Association (SNIA).

Figure 3:
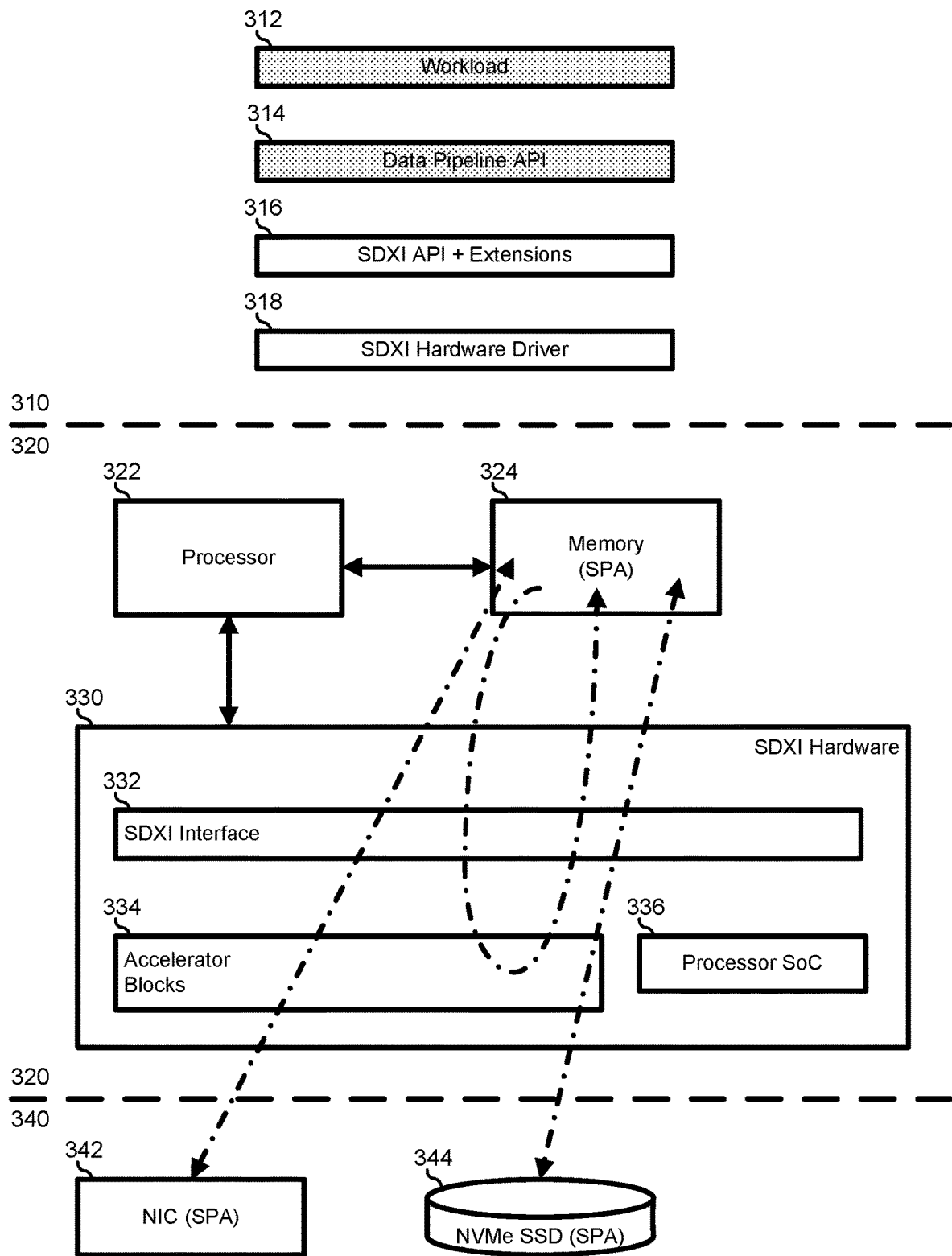
FIG. 3 is a block diagram of an information handling system according to another embodiment of the current disclosure.

FIG. 3 illustrates an embodiment of an information handling system 300 similar to information handling system 200. Information handling system 300 includes a software layer 310, a hardware layer 320, and an attachment layer 340. Software layer 310 is similar to software 210, and includes a workload 212, a data pipeline API 214, a SDXI API 216, and a SDXI hardware driver 218. Hardware layer 320 includes a processor 322, a memory (SPA) 324, and a SDXI hardware device 330. Attachment layer 340 includes a Network Interface Card (NIC) 342 and a Non-Volatile Memory—Express (NVMe) Solid State Drive (SSD) 344. NIC 342 and SSD 344 are each extensions of the SPA space of information handling system 300.

Workload 312 and data pipeline API 314 operate similarly to applications 212 and 214, and context isolation layer 216, and represent elements of a typical information handling system that perform the processing task of the information handling system. In particular, workload 312 operates to perform various operations on data and to move data between different storage and processing elements of information handling system 300, and may make various service calls to data pipeline API to assist in such processing operations and data moves. SDXI API 316 represents an API configured to provide the core operability as specified by a particular revision of an SDXI specification. In addition, SDXI API 316 provides additional extensions to the core operability of the particular SDXI specification, as described below. When workload 312 or data pipeline API 314 invoke SDXI API 316 for the various data operations or data moves, the SDXI API operates to direct SDXI hardware driver 318 elicit SDXI hardware 330 to perform one or more of the invoked operations or data moves, as needed or desired. In this regard, SDXI hardware driver 318 and SDXI hardware 330 are closely associated with each other.

As such, SDXI hardware 330 represents a wide variety of different types of hardware that can be utilized to perform the SDXI core operations and extensions as described herein. An example of SDXI hardware 330 may include accelerator blocks within a general purpose processor or processor family, such as a CPU or the like, a purpose specific processor, such as a GPU or the like, a logic-based device or state-based device, such as a FPGA, a Complex Programmable Logic Device (CPLD) or the like, a smart I/O device that provides in-line data processing in the course of I/O operations, such as a smart NIC, a Host Bus Adapter (HBA), a storage controller such as a RAID controller, a Network Attached Storage (NAS) device, a Storage Area Network (SAN) controller, or the like, or another processing device, as needed or desired. Here, it will be understood that, SDXI hardware 330 may be configured to provide operations consistent with its type, but that are not specifically associated with its SDXI functionality. For example, where SDXI hardware 330 represents a FPGA type of device, it will be understood that the FPGA device may be invoked to provide functionality of a more general nature, in addition to the SDXI functionality as described herein.

SDXI hardware 330 includes a SDXI interface 332, various accelerator blocks 334, and a processor SoC 336. Accelerator blocks 334 may represent hardware accelerators, logic-based or state-based accelerators, or other configurable or pre-configured accelerator functions, as needed or desired. As described further below, SDXI hardware 330 may operate in some embodiments to provide enhanced data pipelining operations. For example, SDXI hardware 330 may provide data movement: between different locations in memory 324, to and from the memory and a network connected to NIC 342, to and from the memory and NVMe SSD 344, to and from the network and the NVMe SSD, and between different locations in the NVME SSD. SDXI hardware 330 may further operate in some embodiments to provide enhanced data transformation operations on data, either as atomic operations or in conjunction with the data movement utilizing various accelerator blocks 334. In particular, various embodiments of SDXI hardware 330 may provide: data compression/decompression, data encryption/decryption, data checksums, hash functions such as SHA-256 hashes and the like, RAID functions, erasure coding, and the like. Other functions that may be performed by SDXI hardware 330 may include data deduplication, LZ-4 compression, compression ratio and block size optimization, data operation chaining, multi-point data movement, uncompressible block handling, and query analytics.

Figure 4:
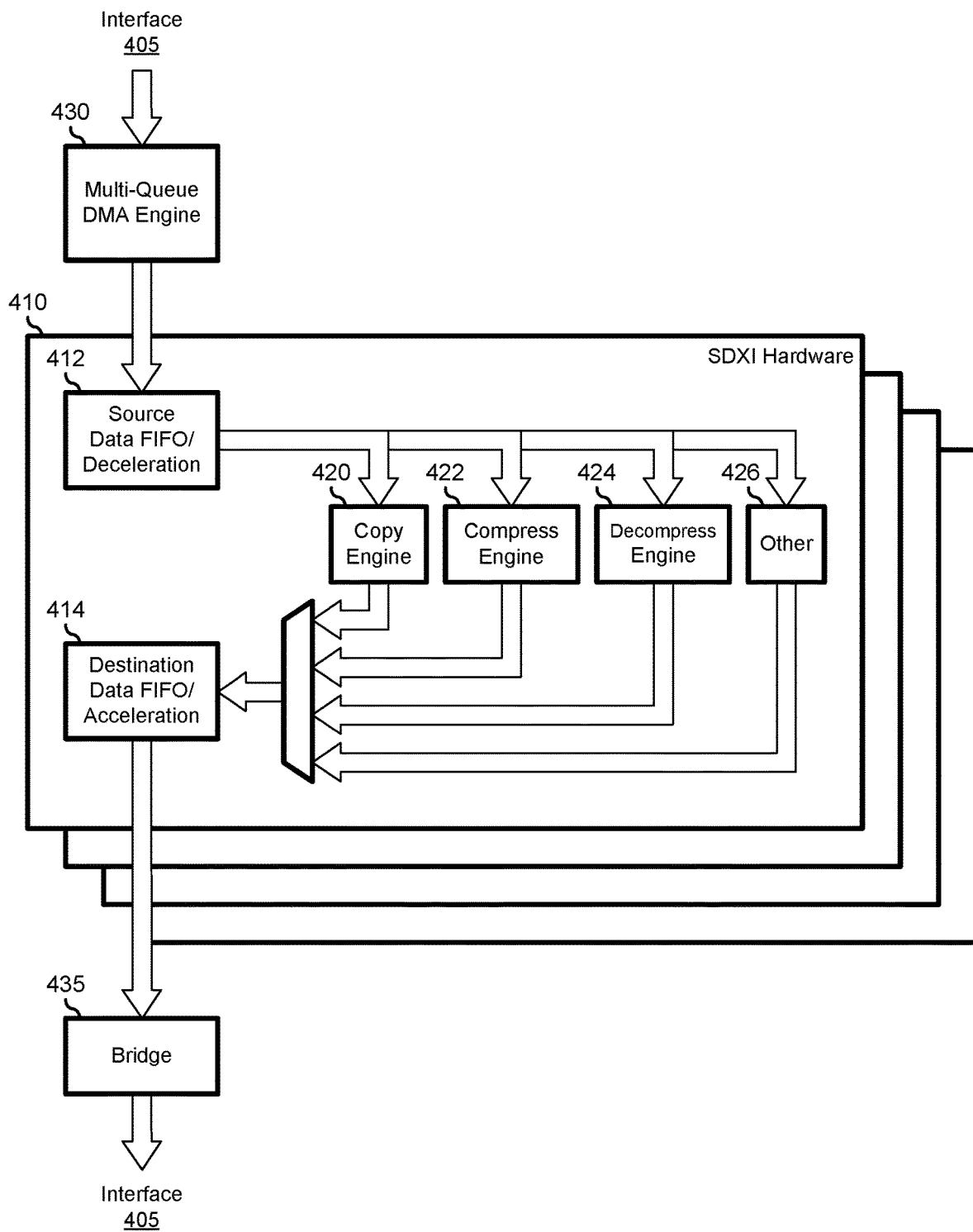
FIG. 4 is a block diagram of a portion of an information handling system according to another embodiment of the current disclosure.

FIG. 4 illustrates an embodiment of an information handling system 400 similar to information handling systems 200 and 300. Information handling system 400 includes a processor complex (not illustrated) that provides a communication interface 405 to provide data communications with multiple SDXI hardware devices 410. An example of interface 405 may include a Third Generation Peripheral Component Interconnect—Express (PCIe Gen3) x16 (16-lane) communication link, a PCIe Gen3 communication link with greater or fewer lanes (e.g., x4, x8, x32), or another communication interface, as needed or desired. Information handling system 400 further includes a multi-queue Direct Memory Access (DMA) engine 430, and a data bridge 435. Each of the SDXI hardware devices 410 are connected to receive data and instructions from DMA engine 430, and to provide data and control information to data bridge 435. DMA engine 430 provides dynamic allocation of parallel data flows to the multiple SDXI hardware devices 410, as needed by the processing tasks operating on information handling system 400. The data flows are provided to DMA engine 430 via interface 405, and may be received from memory or storage devices within the SPA of information handling system 400. Data bridge 435 receives the data flows from SDXI hardware devices 410 and communicates the data flows via interface 405 to the memory and storage devices within the SPA of information handling system 400.

Each of the SDXI hardware devices 410 may be understood to be similar hardware devices, such as where the SDXI hardware devices are each provided by a common manufacturer and are a common device type. Here, DMA engine 430 may allocate data flows to the various SDXI hardware devices 410 based upon factors unrelated to the particular device type of the SDXI hardware devices. For example, DMA engine 430 may allocate data flows based upon the resource loading or availability of each of the SDXI hardware devices, the power level or power state of each of the SDXI hardware devices, or other factors not directly related to the type of the SDXI hardware devices, as needed or desired. Further, each of SDXI hardware devices 410 may be understood to be different hardware devices, such as where the SDXI hardware devices are provided by different manufacturers and are different device types. Here, DMA engine 430 may allocate data flows to the various SDXI hardware devices 410 based upon the type of each of the SDXI hardware devices. For example, where a particular SDXI hardware device 410 represents a network device, DMA engine 430 may allocate network based data flows to that particular SDXI hardware device. On the other hand, where a different SDXI hardware device represents a storage controller, DMA engine 430 may allocate storage based data flows to the other SDXI hardware device.

SDXI hardware device 410 is illustrated as including a source data FIFO/deceleration module 412, a destination data FIFO/acceleration module 414, a copy engine 420, a compression engine 422, a decompression engine 424, and one or more additional engines 426. The configuration illustrated by SDXI hardware device 410 will be understood to be typical, and representative of a wide range of device configurations, as needed or desired. As such, the particular configuration illustrated by SDXI hardware device 410 should not be understood to be limiting on the type, nature, features, configuration, or functionality of SDXI hardware devices in general. Other functions that may be performed by SDXI hardware 410 may include data deduplication, LZ-4 compression, compression ratio and block size optimization, data operation chaining, multi-point data movement, uncompressible block handling, and query analytics.

Possible usages of SDXI include data movements, which may or may not include transforming operations, between one source and multiple destinations. This might be recognized in the industry under many different general terms including but not limited to broadcast, publish and subscribe, multicast, or point to multipoint transmissions.

Figure 5:
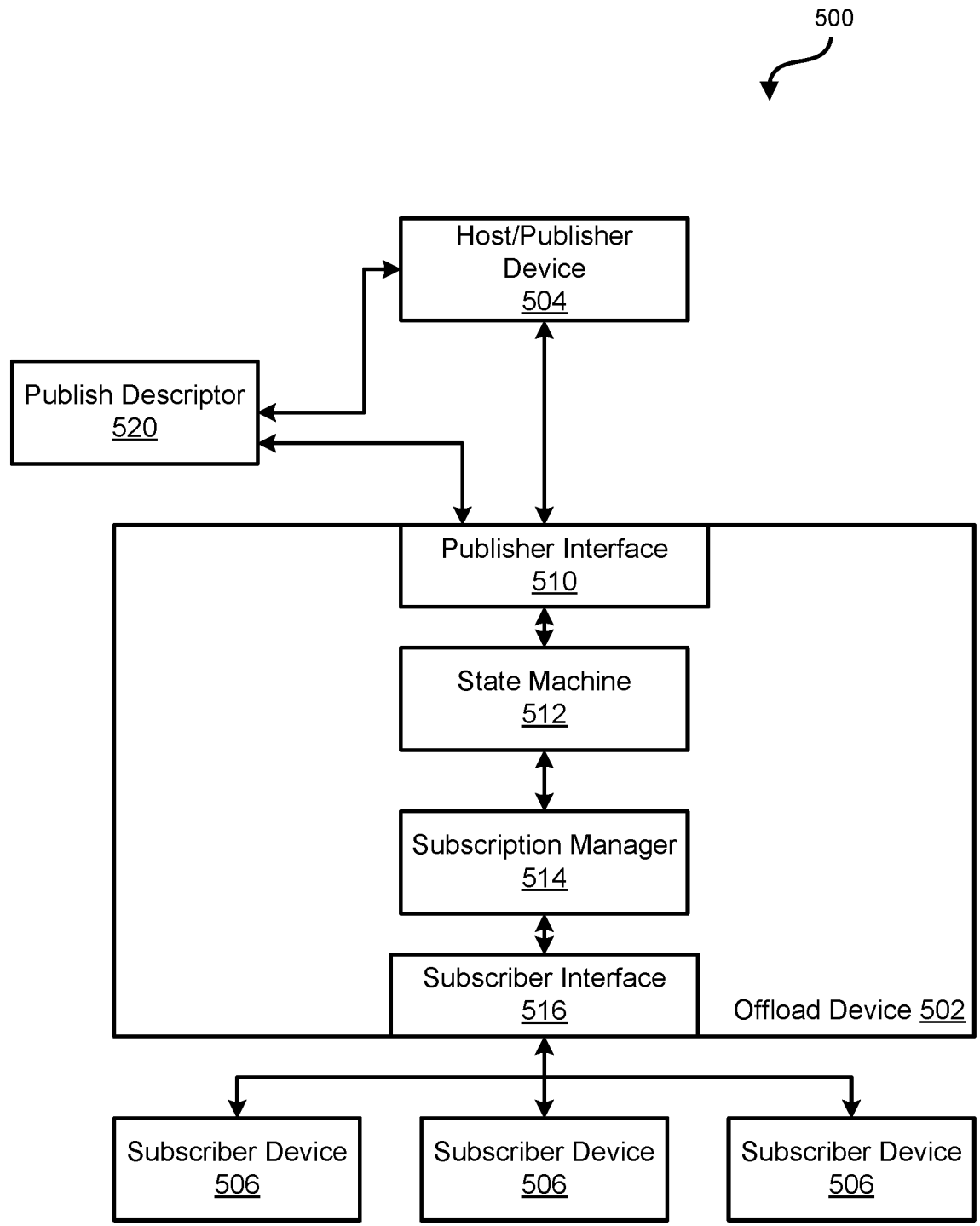
FIG. 5 is a block diagram of a portion of an information handling system according to another embodiment of the current disclosure.

FIG. 5 illustrates a portion of an information handling system 500 according to another embodiment of the current disclosure. Information handling system 500 includes an offload device 502, a host/publisher device 504, and one or more subscriber devices 506. In different examples, offload device 502 may be incorporated within host/publisher device 504 or may be a separate component of information handling system 500 as shown in FIG. 5. Offload device 502 includes a publisher interface 510, a state machine 512, a subscription manager 514, and a subscriber interface 516. In an example, subscriber devices 506 may be any suitable device or component including, but not limited to, memory nodes within a distributed storage array. Offload device 502 may be any suitable device including, but not limited to, a field programmable gate array (FPGA), and a smart network interface card (SmartNIC). In certain examples, interfaces 510 and 516 may be located within a hardware fabric level of information handling system 500. One of ordinary skill in the art would recognize that information handling system 500 may include addition components without varying from the scope of this disclosure.

During operation, host/publisher device 504 may provide a data transmission to one or more of subscriber devices 506. In an example, the data transmission to multiple subscriber devices 506 may entail the replication of the data across all of the subscriber devices. In previous information handling systems, the network packet to transmit the data may be replicated multiple times to provide different point-to-point transmissions of the data from host/subscriber device to each subscriber device 506. In these previous information handling systems, a compute node within the information handling system would perform the replication of the data so that multiple packets with essentially the same content may be transmitted to subscriber devices 506. Information handling system 500 may be improved by utilizing offload device 502 to perform point-to-multipoint transmissions within the information handling system. Offload device 502 may enable the transmission of the same data to all subscriber devices 506 without replicating a network packet, such that computing power and computing time may be reduced within information handling system 500.

In an example, offload device 502 may perform one or more operations to configure a point-to-multipoint transmission between host/publisher device 504 and subscriber devices 506. For example, at boot of information handling system 500, offload device 502 may know total possible subscribers (TS) within the information handling system. Offload device 502 may allocate one or more of the TS to a virtual disk (VD) or topic during configuration of the offload device. For example, offload device 502 may receive, via subscriber interface 516, a subscription request from one of subscriber devices 506. A control plane operation within information handling system 500 may be utilized to register subscriber device 506 with publisher device 504. In an example, subscription manager 514 may register subscriber device 506 to a particular VD within a publish/subscribe table and also include an address for subscriber device 506 in the lookup table. Creation of the publish/subscribe table will be discussed with reference to FIG. 6 below.

Figure 6:
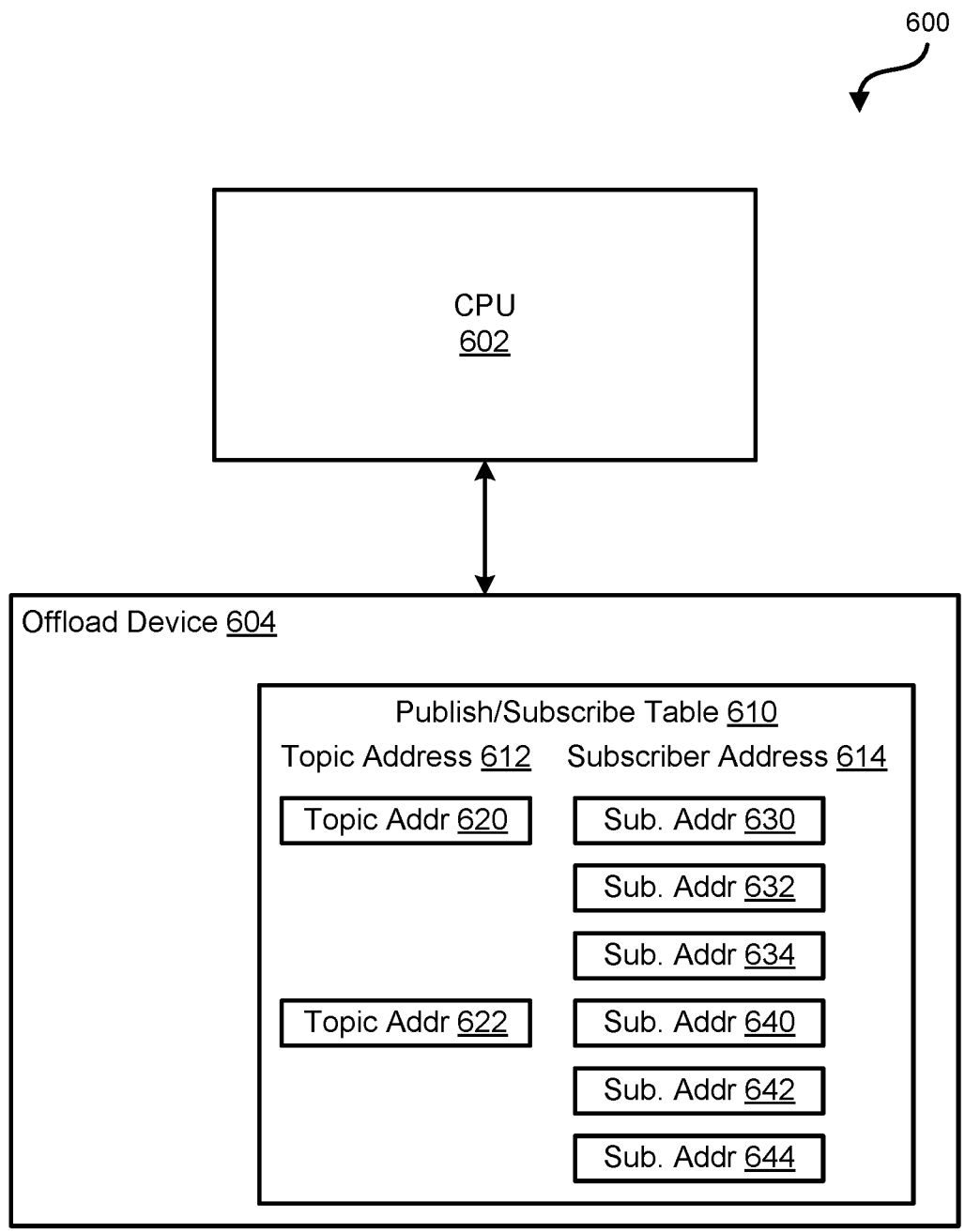
FIG. 6 is a block diagram of a portion of an information handling system according to another embodiment of the current disclosure.

FIG. 6 illustrates a portion of an information handling system 600 is illustrated according to an embodiment of the current disclosure. Information handling system 600 may be substantially similar to any information handling system including, but not limited to, information handling systems 100, 200, 300, 400, and 500 respectively of FIGS. 1, 2, 3, 4, and 5. Information handling system 600 includes a central processing unit (CPU) 602 and an offload device 604. Offload device 604 includes a publish/subscribe table 610, which in turn stores one or more topic addresses 612 and one or more destination/subscriber addresses 614. Publish/subscriber table 610 may be a lookup table that offload device 604 may utilize to translate a topic address 612 into a subscriber address 614. Publish/subscribe table 610 may include multiple subscriber addresses 614 for each destination/topic address 612. For example, a topic address 620 may be associated with subscriber addresses 630, 632 and 634. Similarly, topic address 622 may associated with subscriber addresses 640, 642 and 644. In an example, local/topic address 612 may be utilized as a tag for the data packet transmission as will be described below.

In an example, the transmission of data from CPU 602 to multiple subscribers may be offloaded to offload device 604. For example, CPU 602 may transmit a single data packet over any suitable interface, such as a PCIe interface, to offload device 604. In certain examples, offload device 604 may be configured in any suitable manner. For example, offload device 604 may be configured via a control plane of information handling system 600, and the configuration may set data plane operations for the offload device to translate topic address 612 into one or more subscriber addresses 614. In an example, the configuration of offload device 604 may be performed in any suitable manner including, but not limited to, in a similar manner as configuring software defined networking (SDN) system.

Offload device 604 may perform one or more suitable operations to create and manage publish/subscribe table 610. For example, offload device 604 may receive a subscribe message from one or more subscriber devices and the subscribe message may include a subscriber address 614 and an indication of a destination address, such as an address for a particular VD, associated with the subscriber device. In response to the subscribe message, offload device 604 may create a topic address, such as topic address 820, for the VD destination address, and may associate the subscriber address, such as subscriber address 630, with the topic address within publish/subscribe table 610. Offload device 604 may associate subscriber addresses with a topic address based on each subscribe message received by the offload device. In an example, the subscriber address may be any suitable type of address including, but not limited to, higher order BAR bits of a data transmission packet.

Figure 7:
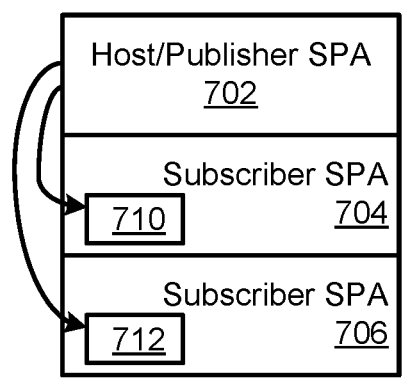
FIG. 7 is a block diagram of system physical addresses in an information handling system according to another embodiment of the current disclosure.

Referring back to FIG. 5, the destination address for the data transmission does not have to be located within the system physical address (SPA) space of host/publisher device 504 as shown in FIG. 7.

FIG. 7 illustrates multiple system physical addresses (SPAs) in an information handling system according to another embodiment of the current disclosure. An information handling system, such as information handling system 500, includes a host/publisher SPA 702, and subscriber SPAs 704 and 706. In an example, host/publisher SPA 702 may include data to be replicated and stored within subscriber SPAs 704 and 706. In certain examples, destination addresses 710 and 712 for a storage location within subscriber SPAs 704 and 706 may be within any suitable address space including, but not limited to, within host/publisher SPA 702, and within separate subscriber SPAs 704 and 706 as shown in FIG. 7.

In an example, a data transfer from host/publisher SPA 702 to destination address 710 within subscriber SPA 704 and to destination address 712 within subscriber SPA 706 may be provided over any suitable interface. For example, the interface for the data transmission may including, but is not limited to, PCIe, CXL, Gen-Z, and Ethernet.

Referring back to FIG. 5, offload device 502 may receive a publication request from publisher device 504 via publisher interface 510. In an example, the publication request may be associated with a publish descriptor 520. In response to the publication request, state machine 512 and subscription manager 514, may perform one or more suitable operations to send the data of the publication request to one or more subscriber devices 506. In an example, host/publisher device 504 may be aware of an order in which the translated addresses are stored in a lookup table of offload device 502, and may be aware of subscriber devices 506 allocated to a particular VD. Host/publisher device 504 may utilize this information in perform a data transmission to one or more of subscriber device 506. In an example, publish descriptor 520 of the data transmission packet may include a mask along with the data, and the mask may indicate a group of drives or VD to transmit the data. Host/publisher device 504 may create publish descriptor 520 and then ring a doorbell with offload device 502 via publish interface 510. Offload device 502 may retrieve the source data from an address specified in publish descriptor 520. In response to receiving the data, offload device 502 may perform one or more operations to send the data to subscriber devices 506 associated with the destination or topic address indicated by the mask. Transmission of the data to one or more of subscriber devices 506 will be described with reference to FIG. 6 below.

Referring back to FIG. 6, CPU 602 may provide offload device 604 with data to be transferred to one or more subscriber devices, and may also provide a destination address for the data. In response to the reception of the data and destination address, offload device 604 may translate the destination address to a topic address 612 and lookup the one or more subscriber addresses 614 associated with the topic address. For example, if a destination address for a particular set of data is translated into topic address 620, offload device 604 may identify subscriber addresses 630, 632, and 634 as addresses to send the data. Offload device 604 may then perform a memory copy or transform to each of the subscriber addresses 630, 632, and 634. Similarly, if a destination address for a particular set of data is translated into topic address 622, offload device 604 may identify subscriber addresses 640, 642, and 644 as addresses to send the data. Offload device 604 may then perform a memory copy or transform to each of the subscriber addresses 640, 642, and 644. Thus, CPU 602 may send a single message or data transfer and offload device 604 may perform one or more operations to convert the single data transfer into multiple data transfers based on the publish/subscribe table 610.

Referring back to FIG. 5, offload device 502 may utilize the lookup table, such as publish/subscribe table 610 of FIG. 6, to perform a one-to-many data transfer as described herein. Thus, offload device 502 may improve information handling system 500 by enabling a one-to-many data transfer without the need for host/publisher device 504 generate multiple network transmission packets for the data that is to be sent to subscriber devices 506.

Figure 8:
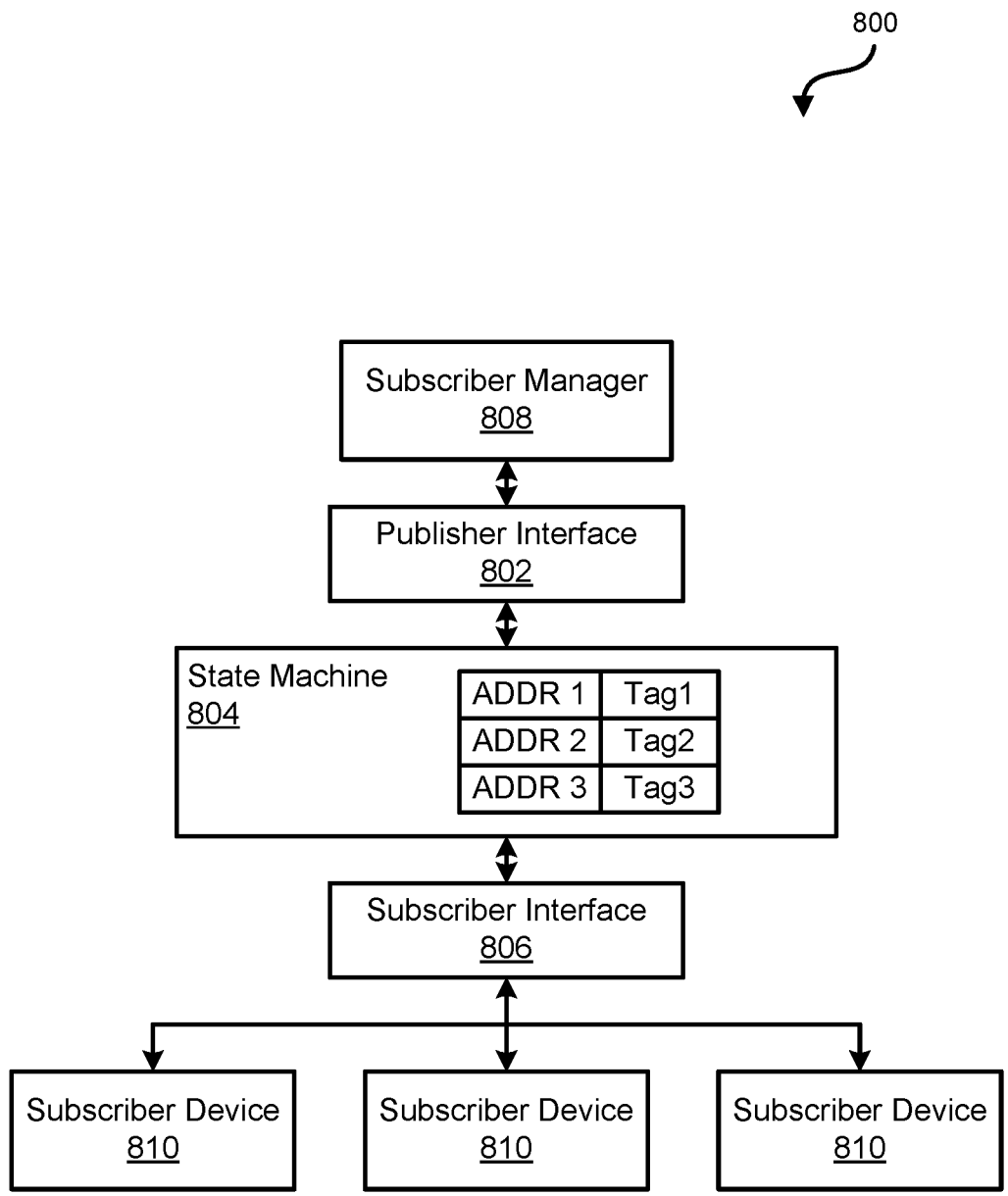
FIG. 8 is a block diagram of a portion of an information handling system according to another embodiment of the current disclosure.

FIG. 8 illustrates of a portion of an information handling system 800 according to an embodiment of the current disclosure. In an example, information handling system 800 may be substantially similar to any suitable system, device, or component including, but not limited to, information handling system 500 of FIG. 5. Information handling system 800 includes a publisher interface 802, a state machine 804, a subscriber interface 806, a subscriber manager 808, and one or more subscriber devices 810. In an example, publisher interface 802, state machine 804, subscriber interface 806, subscriber manager 808 may be components or devices within an offload device, such as offload device 502 of FIG. 5. One of ordinary skill would recognize that information handling system 800 may include additional components without varying from the scope of this disclosure.

In an example, subscriber manager 808 may provide the data and a mask for the data to publisher interface 802, which in turn may read the data, and an address or mask associated with the data. Publisher interface 802 may provide the mask to state machine 804, which in turn may determine a destination or topic address for the data based on the mask. State machine 804 may translate the topic address into multiple subscriber addresses, such as ADDR1, ADDR2, and ADDR3 in table 820. In an example, state machine 804 may utilize ADDR1, ADDR2, and ADDR3 as respective tags Tag1, Tag2, and Tag3 for corresponding subscriber devices.

In certain examples, Tag1, Tag2, and Tag3 may be specific to a particular bus or interconnect, and state machine 804 may perform a write on subscriber interface 806 using specific tags, such as Tag1, Tag2, and Tag3, associated with the interconnect or protocol. State machine 804 may utilize the tags to transmit the data to identified subscriber devices 810. In an example, a separate unicast packet transmission may be sent to each subscriber device 810 to deliver the single packet transmission to multiple subscriber addresses. In an example, the subscriber addresses may be in any suitable SPA including, but not limited to, the same SPA as a publisher device, and a different SPA as the publisher device.

In an example, state machine may utilize the tags in table 820 to determine whether the packet transmission has been sent to each subscriber device 810. For example, in response to the packet transmission being sent to each of the subscriber addresses, acknowledgement messages may be received from subscriber devices 810. In an example, state machine 804 may include a flag array to track subscriber devices 810 that have sent an acknowledgement message. In certain examples, each entry in the flag array may correspond to a different one of the multiple subscriber devices 810. In response to an acknowledgement message being received from a particular subscriber device 810, an entry within the flag array may be set to a first value. In an example, the entry may correspond to the particular subscriber device 810.

In response to acknowledgement messages being received from all subscriber devices, state machine 804 may compile each acknowledgement message received from subscriber devices 810 into a single a composite completion message. State machine 804 may then send the composite completion message to the host/publisher device via publisher interface 802. In certain examples, state machine 804 may send the composite completion message to the host/publisher device to provide a single message indicating that the packet transmission has been received by all subscriber devices.

Figure 9:
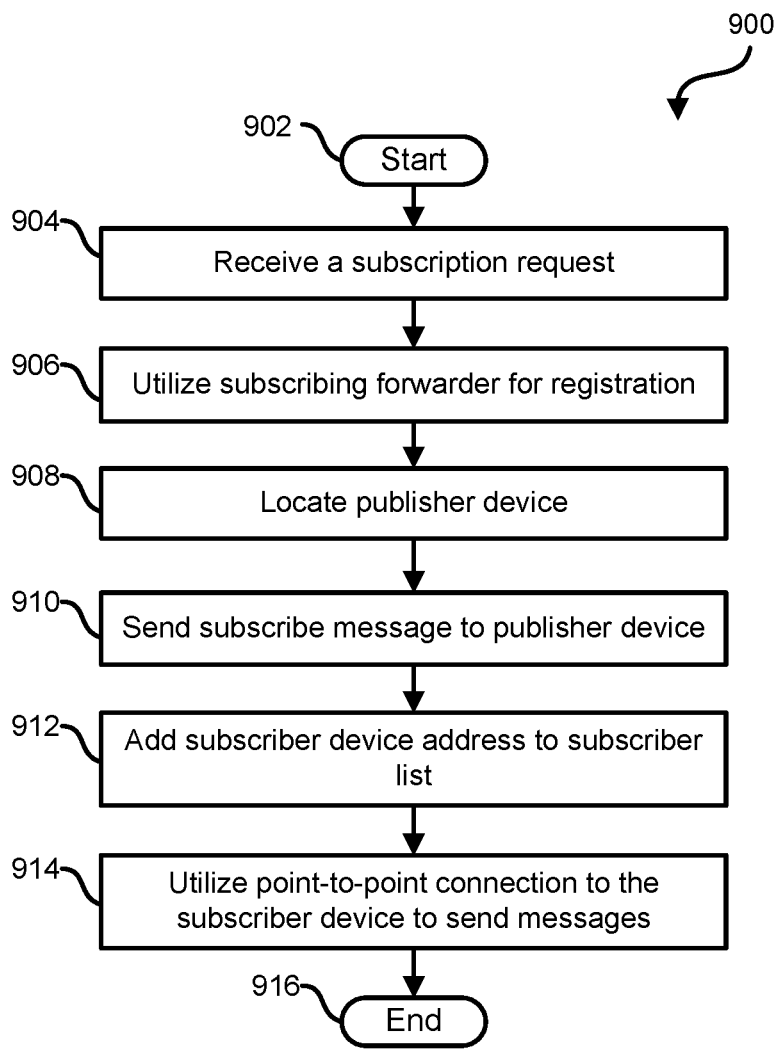
FIG. 9 is a flow diagram of a method for handling a subscription request in an information handling system according to another embodiment of the current disclosure.

FIG. 9 is a flow diagram of a method 900 for handling a subscription request in an information handling system according to another embodiment of the current disclosure, starting at block 902. It will be readily appreciated that not every method step set forth in this flow diagram is always necessary, and that certain steps of the methods may be combined, performed simultaneously, in a different order, or perhaps omitted, without varying from the scope of the disclosure. FIG. 9 may be employed in whole, or in part, by information handling system 100 depicted in FIG. 1 or any other type of system, controller, device, module, processor, or any combination thereof, operable to employ all, or portions of, the method of FIG. 9.

At block 904, a subscription request is received. In an example, the subscription request may be received from any suitable device within an information handling system including, but not limited to, a storage device in a redundant array of independent disks (RAID), a storage device in a distributed storage array, and a storage space in a distributed memory.

At block 906, a subscribing forwarder device is utilized for registration of the subscriber device. In an example, a client or host/publisher device may utilize the subscribing forwarder device as an intermediary to enable registration of the subscriber device without the host/publisher device processing the request. In certain examples, the registration of the subscriber device may be performed via a control plane operation of one or more components of the information handling system. At block 908, the publisher device is located. In an example, the subscribing forwarder device may locate the publisher device in any suitable manner. For example, the subscribing forwarder device may utilize an existing publishing forwarder device to locate the publisher device.

At block 910, a subscribe message is sent to the publisher device. In an example, any suitable component may provide the subscribe message to the publisher device. For example, the subscribing forwarder device or the publishing forwarder device may send the subscribe message to the publisher device. In certain examples, the subscribe message may be sent as a control plane message. At block 912, an address of the subscriber device is added to a subscriber list. At block 914, a point-to-point connection to the subscriber device is utilized to send packet transmissions from the publisher device to the subscriber device, and the method ends at block 916. In an example, the address of the subscriber device is utilized in the point-to-point connection.

Figure 10:
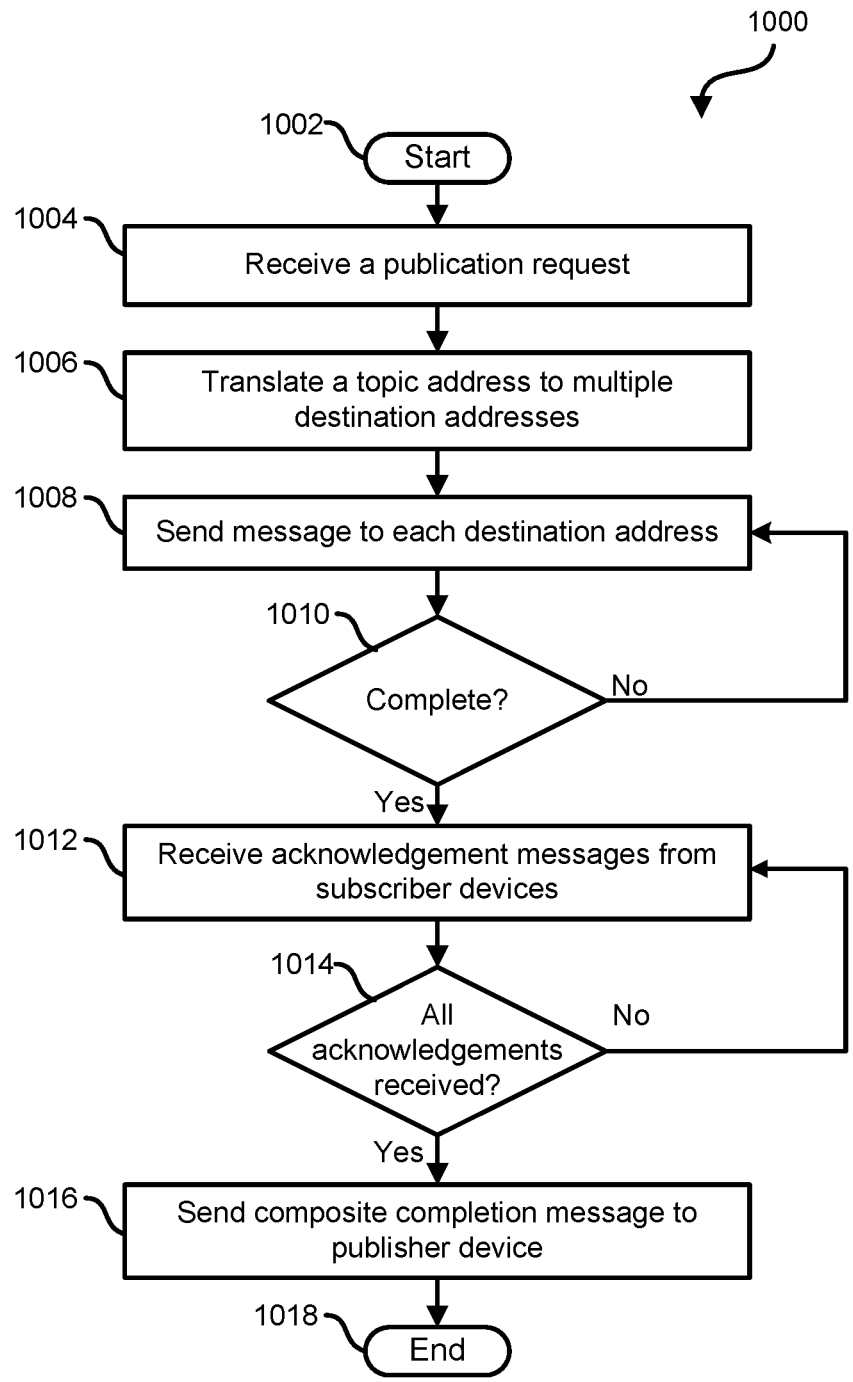
FIG. 10 is a flow diagram of a method for handling a publication request in an information handling system according to another embodiment of the current disclosure.

FIG. 10 is a flow diagram of a method for handling a publication request in an information handling system according to another embodiment of the current disclosure, starting at block 1002. It will be readily appreciated that not every method step set forth in this flow diagram is always necessary, and that certain steps of the methods may be combined, performed simultaneously, in a different order, or perhaps omitted, without varying from the scope of the disclosure. FIG. 10 may be employed in whole, or in part, by information handling system 100 depicted in FIG. 1 or any other type of system, controller, device, module, processor, or any combination thereof, operable to employ all, or portions of, the method of FIG. 10.

At block 1004, a publication request is received. In an example, an offload device may receive the publication request from a publisher device. At block 1006, a topic address is translated to multiple destination addresses. In an example, the offload device may be any suitable device including, but not limited to, a component or device within the publisher device. In certain examples, the topic address may be associated with a destination address for a group of subscriber devices. In an example, the topic address may serve as a tag to identify one or more destination addresses for one or more subscriber devices.

At block 1006, a topic address is translated into one or more subscriber addresses. In an example, a translation table is utilized to identify the subscriber addresses associated with the topic address. At block 1008, a packet transmission is sent to each subscriber address. In an example, the packet transmission may include any suitable information including, but not limited to, data to be written in each subscriber device. In certain examples, a separate unicast packet transmission may be sent to each of the subscriber addresses to deliver the single packet transmission to multiple subscriber addresses. In an example, the subscriber addresses may be in any suitable system physical address (SPA) including, but not limited to, the same SPA as the publisher device, and a different SPA as the publisher device.

At block 1010, a determination is made whether the packet transmission has been sent to each of the subscriber addresses. In response to the packet transmission being sent to each of the subscriber addresses, acknowledgement messages are received from subscriber devices associated with the subscriber addresses at block 1012. In an example, a flag array may be utilized to tract the subscriber devices that have sent an acknowledgement message. In certain examples, each entry in the flag array may correspond to a different one of the multiple subscriber devices. In response to an acknowledgement message being received from a particular subscriber device, an entry within the flag array may be set to a first value. In an example, the entry may correspond to the particular subscriber device.

At block 1014, a determination is made whether acknowledgement messages have been received from all subscriber devices. In response to acknowledgement messages being received from all subscriber devices, a composite completion message is sent to the publisher device at block 1016, and the method ends at block 1018. In an example, the composite completion message may be formed by each acknowledgement message being compiled together into the composite completion message. In certain examples, the composite completion message may be sent to the publisher device to provide a single message indicating that the packet transmission has been received by all subscriber devices.

Figure 11:
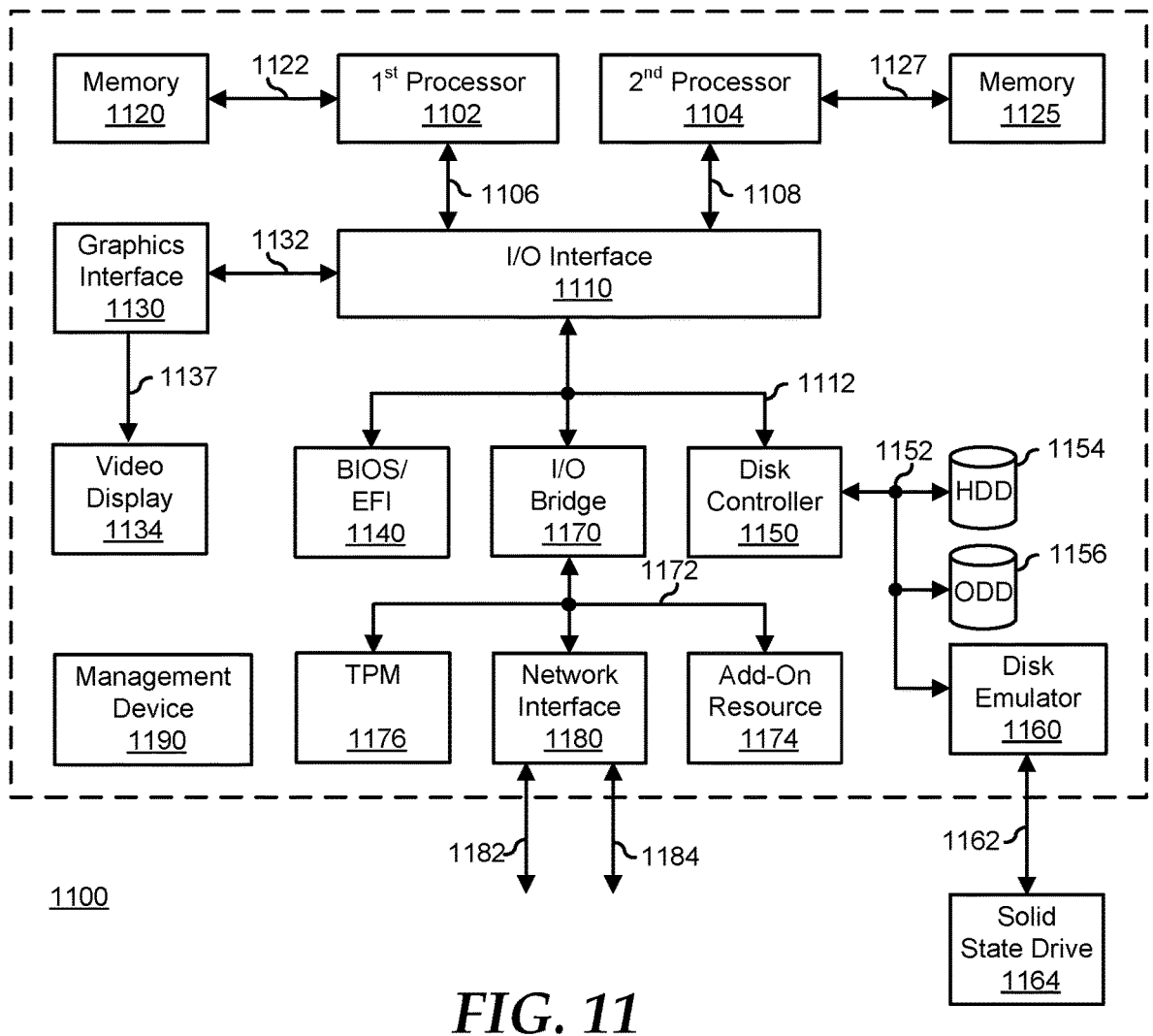
FIG. 11 is a block diagram illustrating a generalized information handling system according to another embodiment of the present disclosure.

FIG. 11 illustrates a generalized embodiment of an information handling system 1100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 1100 can include processing resources for executing machine-executable code, such as a central processing unit (CPU), a programmable logic array (PLA), an embedded device such as a System-on-a-Chip (SoC), or other control logic hardware. Information handling system 1100 can also include one or more computer-readable medium for storing machine-executable code, such as software or data. Additional components of information handling system 1100 can include one or more storage devices that can store machine-executable code, one or more communications ports for communicating with external devices, and various input and output (I/O) devices, such as a keyboard, a mouse, and a video display. Information handling system 1100 can also include one or more buses operable to transmit information between the various hardware components.

Information handling system 1100 can include devices or modules that embody one or more of the devices or modules described below, and operates to perform one or more of the methods described below. Information handling system 1100 includes a processors 1102 and 1104, an input/output (I/O) interface 1110, memories 1120 and 1125, a graphics interface 1130, a basic input and output system/universal extensible firmware interface (BIOS/UEFI) module 1140, a disk controller 1150, a hard disk drive (HDD) 1154, an optical disk drive (ODD) 1156, a disk emulator 1160 connected to an external solid state drive (SSD) 1162, an I/O bridge 1170, one or more add-on resources 1174, a trusted platform module (TPM) 1176, a network interface 1180, a management device 1190, and a power supply 1195. Processors 1102 and 1104, I/O interface 1110, memory 1120, graphics interface 1130, BIOS/UEFI module 1140, disk controller 1150, HDD 1154, ODD 1156, disk emulator 1160, SSD 1162, I/O bridge 1170, add-on resources 1174, TPM 1176, and network interface 1180 operate together to provide a host environment of information handling system 1100 that operates to provide the data processing functionality of the information handling system. The host environment operates to execute machine-executable code, including platform BIOS/UEFI code, device firmware, operating system code, applications, programs, and the like, to perform the data processing tasks associated with information handling system 1100.

In the host environment, processor 1102 is connected to I/O interface 1110 via processor interface 1106, and processor 1104 is connected to the I/O interface via processor interface 1108. Memory 1120 is connected to processor 1102 via a memory interface 1122. Memory 1125 is connected to processor 1104 via a memory interface 1127. Graphics interface 1130 is connected to I/O interface 1110 via a graphics interface 1132, and provides a video display output 1136 to a video display 1134. In a particular embodiment, information handling system 1100 includes separate memories that are dedicated to each of processors 1102 and 1104 via separate memory interfaces. An example of memories 1120 and 1130 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 1140, disk controller 1150, and I/O bridge 1170 are connected to I/O interface 1110 via an I/O channel 1112. An example of I/O channel 1112 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 1110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 1140 includes BIOS/UEFI code operable to detect resources within information handling system 1100, to provide drivers for the resources, initialize the resources, and access the resources. BIOS/UEFI module 1140 includes code that operates to detect resources within information handling system 1100, to provide drivers for the resources, to initialize the resources, and to access the resources.

Disk controller 1150 includes a disk interface 1152 that connects the disk controller to HDD 1154, to ODD 1156, and to disk emulator 1160. An example of disk interface 1152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1160 permits SSD 1164 to be connected to information handling system 1100 via an external interface 1162. An example of external interface 1162 includes a USB interface, an IEEE 1394 (Firewire) interface, a proprietary interface, or a combination thereof. Alternatively, solid-state drive 1164 can be disposed within information handling system 1100.

I/O bridge 1170 includes a peripheral interface 1172 that connects the I/O bridge to add-on resource 1174, to TPM 1176, and to network interface 1180. Peripheral interface 1172 can be the same type of interface as I/O channel 1112, or can be a different type of interface. As such, I/O bridge 1170 extends the capacity of I/O channel 1112 when peripheral interface 1172 and the I/O channel are of the same type, and the I/O bridge translates information from a format suitable to the I/O channel to a format suitable to the peripheral channel 1172 when they are of a different type. Add-on resource 1174 can include a data storage system, an additional graphics interface, a network interface card (NIC), a sound/video processing card, another add-on resource, or a combination thereof. Add-on resource 1174 can be on a main circuit board, on separate circuit board or add-in card disposed within information handling system 1100, a device that is external to the information handling system, or a combination thereof.

Network interface 1180 represents a NIC disposed within information handling system 1100, on a main circuit board of the information handling system, integrated onto another component such as I/O interface 1110, in another suitable location, or a combination thereof. Network interface device 1180 includes network channels 1182 and 1184 that provide interfaces to devices that are external to information handling system 1100. In a particular embodiment, network channels 1182 and 1184 are of a different type than peripheral channel 1172 and network interface 1180 translates information from a format suitable to the peripheral channel to a format suitable to external devices. An example of network channels 1182 and 1184 includes InfiniBand channels, Fibre Channel channels, Gigabit Ethernet channels, proprietary channel architectures, or a combination thereof. Network channels 1182 and 1184 can be connected to external network resources (not illustrated). The network resource can include another information handling system, a data storage system, another network, a grid management system, another suitable resource, or a combination thereof.

Management device 1190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 1100. In particular, management device 1190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 1100, such as system cooling fans and power supplies. Management device 1190 can include a network connection to an external management system, and the management device can communicate with the management system to report status information for information handling system 1100, to receive BIOS/UEFI or system firmware updates, or to perform other task for managing and controlling the operation of information handling system 1100. Management device 1190 can operate off of a separate power plane from the components of the host environment so that the management device receives power to manage information handling system 1100 when the information handling system is otherwise shut down. An example of management device 1190 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 1190 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
    a publisher device associated with multiple subscriber devices; and
    an offload device to communicate with the publisher device, the offload device to:
        during a configuration of the offload device, assign each of the subscriber devices to a single virtual disk;
        receive a packet transmission from the publisher device;
        translate a topic address of the packet transmission to multiple destination addresses;
        send the packet transmission to each of the subscriber devices in the single virtual disk, wherein each of the subscriber devices is associated with a corresponding destination address of the multiple destination address;
        receive a corresponding one of different acknowledgements from the each of the subscriber devices;
        combine the different acknowledgements into a single composite completion message; and
        send the single composite completion message to the publisher device.

2. The information handling system of claim 1, wherein the offload device includes:
    an interface to send the packet transmission to each of the subscriber devices; and
    a state machine, the state machine to:
        write the packet transmission on the interface; and
        track write completions based on the acknowledgements from the subscriber devices.

3. The information handling system of claim 1, wherein the offload device further to:
    maintain a lookup table, wherein the lookup table is utilized to translate the topic address into the multiple destination addresses.

4. The information handling system of claim 1, wherein the offload device further to:
    maintain a flag array, wherein each entry in the flag array corresponds to a different one of the multiple subscriber devices; and
    in response to receiving a first acknowledgement message from a first subscriber device, set a first entry of the flag array to a first value, wherein the first entry corresponds to the first subscriber device.

5. The information handling system of claim 1, wherein the packet transmission is sent to each of the subscriber devices via separate unicast transmission to each of the subscriber devices.

6. The information handling system of claim 1, wherein the destination addresses are not within a host address space of the publisher device.

7. The information handling system of claim 1, wherein the offload device further to maintaining a composite address space, wherein multiple destination address spaces are accessible and targeted by a host to/from a system physical address space.

8. A method comprising:
    during a configuration of a offload device, assigning, by the offload device, each of multiple subscriber devices to a single virtual disk;
    receiving, by the offload device, a packet transmission from a publisher device, wherein multiple subscriber devices are associated with the publisher device;
    translating a topic address of the packet transmission to multiple destination addresses;
    sending the packet transmission to each of the subscriber devices in the single virtual disk, wherein each of the subscriber devices is associated with a corresponding destination address of the multiple destination address;
    receiving a corresponding one of different acknowledgements from the each of the subscriber devices;
    combining the different acknowledgements into a single composite completion message; and
    sending the single composite completion message to the publisher device.

9. The method of claim 8, the method further comprising:
    writing, by a state machine of the offload device, the packet transmission on an interface of the offload device, wherein the interface device sends the packet transmission to each of the subscriber devices; and track write completions based on the acknowledgements from the subscriber devices.

10. The method of claim 9, further comprising:
maintaining a lookup table, wherein the lookup table is utilized to translate the topic address into the multiple destination addresses.

11. The method of claim 8, further comprising:
maintaining a composite address space, wherein multiple destination address spaces are accessible and targeted by a host to/from a system physical address space.

12. The method of claim 8, further comprising:
maintaining a flag array, wherein each entry in the flag array corresponds to a different one of the multiple subscriber devices; and
in response to receiving a first acknowledgement message from a first subscriber device, setting a first entry of the flag array to a first value, wherein the first entry corresponds to the first subscriber device.

13. The method of claim 8, wherein the packet transmission is sent to each of the subscriber devices via separate unicast transmissions to each of the subscriber devices.

14. The method of claim 8, wherein the destination addresses are not within a host address space of the publisher device.

15. A non-transitory computer-readable medium including code that when executed performs a method, the method comprising:
during a configuration of a offload device, assigning, by the offload device, each of multiple subscriber devices to a single virtual disk;
receiving a packet transmission from a publisher device associated with multiple subscriber devices;
translating a topic address of the packet transmission to multiple destination addresses;
sending the packet transmission to each of the subscriber devices in the single virtual disk, wherein each of the subscriber devices is associated with a corresponding one of the destination address;
receiving a corresponding one of different acknowledgements from the each of the subscriber devices;
combining the different acknowledgements into a single composite completion message; and
sending the single composite completion message to the publisher device.

16. The non-transitory computer-readable medium of claim 15, wherein the method further comprises:
writing, by a state machine of an offload device, the packet transmission on an interface of the offload device, wherein the interface device sends the packet transmission to each of the subscriber devices; and
track write completions based on the acknowledgements from the subscriber devices.

17. The non-transitory computer-readable medium of claim 15, wherein the method further comprises maintaining a lookup table, wherein the lookup table is utilized to translate the topic address into the destination addresses.

18. The non-transitory computer-readable medium of claim 15, further comprising:
maintaining a composite address space, wherein multiple destination address spaces are accessible and targeted by a host to/from a system physical address space.

19. The non-transitory computer-readable medium of claim 15, further comprising:
maintaining a flag array, wherein each entry in the flag array corresponds to a different one of the subscriber devices; and
in response to receiving a first acknowledgement message from a first subscriber device, setting a first entry of the flag array to a first value, wherein the first entry corresponds to the first subscriber device.

20. The non-transitory computer-readable medium of claim 15, wherein the packet transmission is sent to each of the subscriber devices via separate unicast transmissions to each of the subscriber devices.

* * * * *